United States Patent Office 3,664,549
Patented May 23, 1972

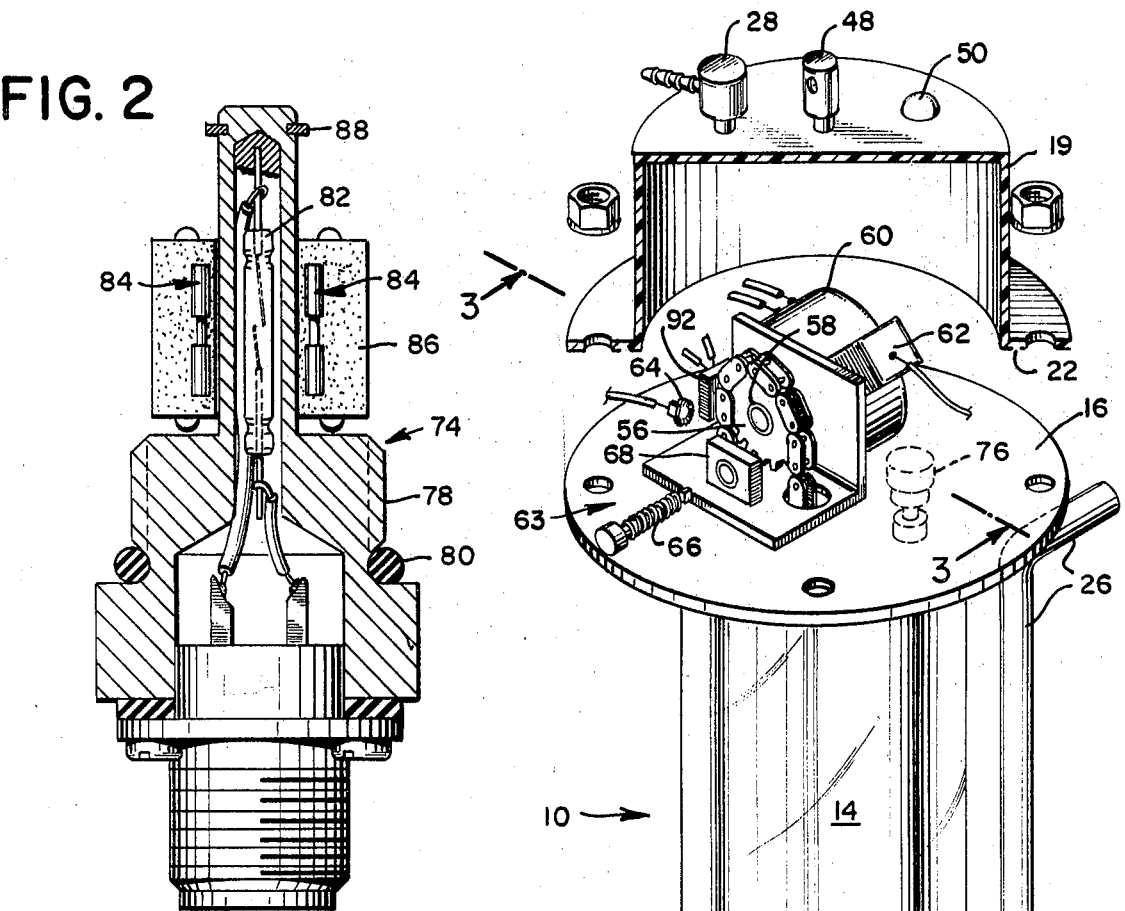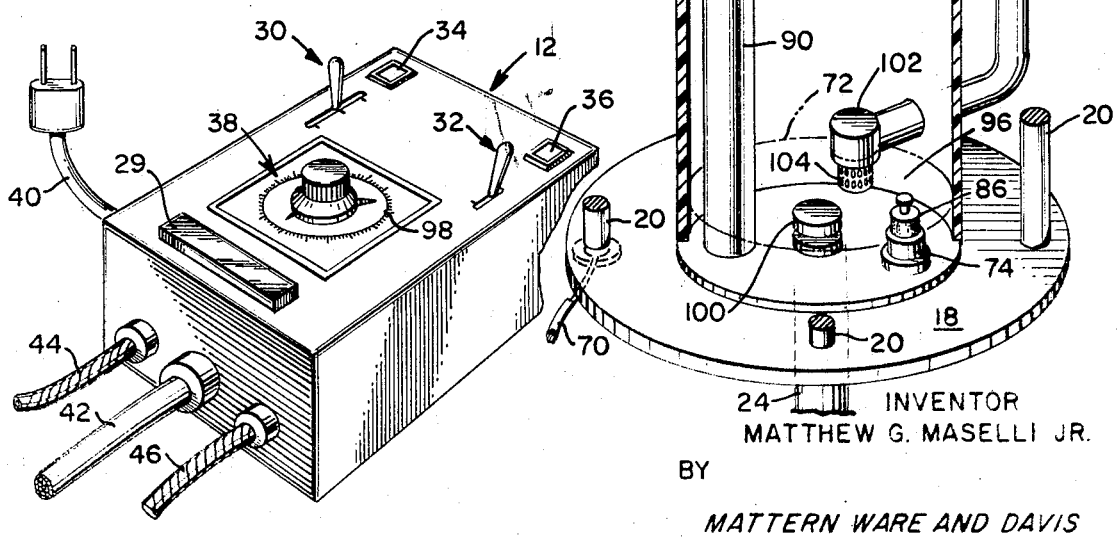

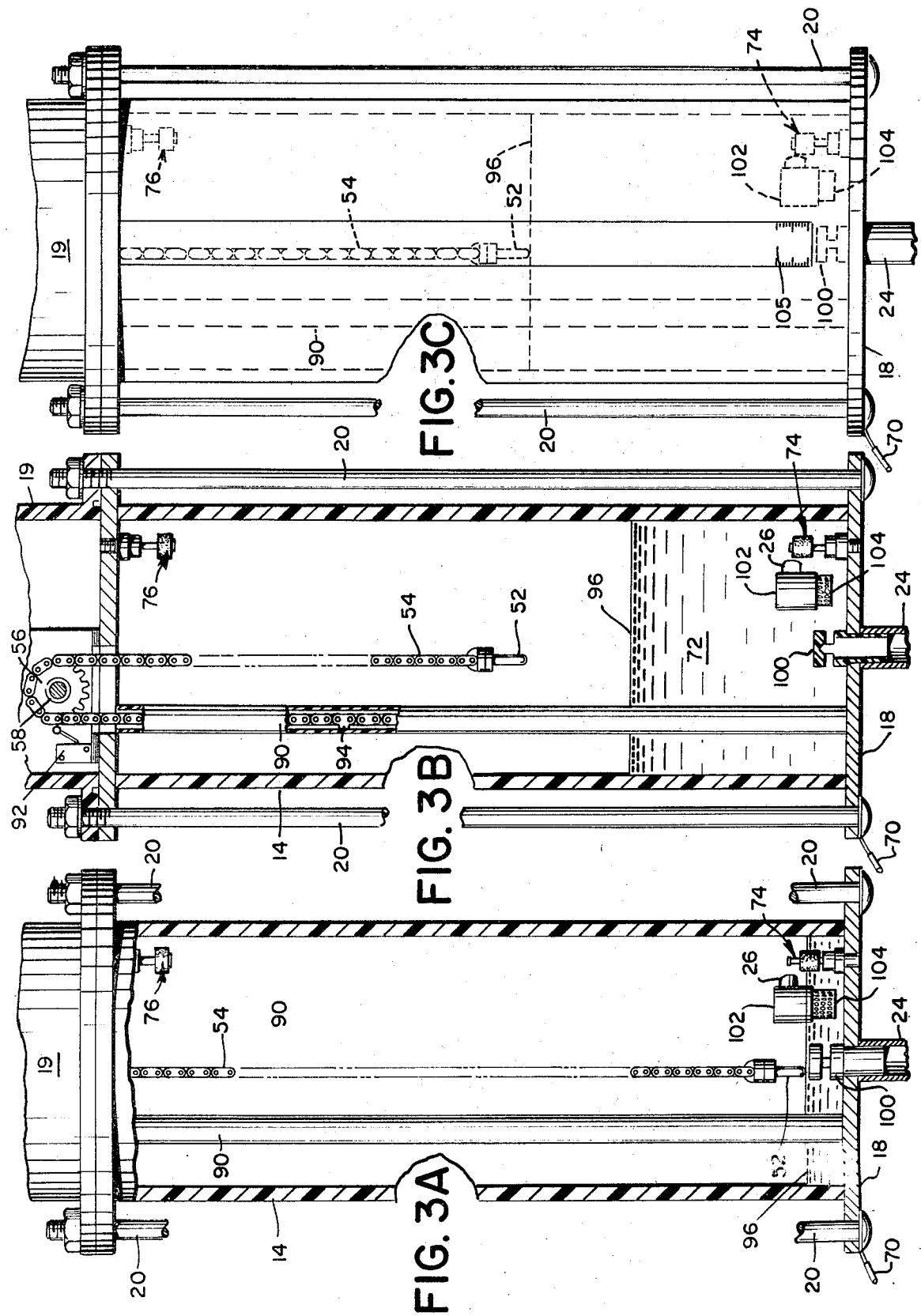

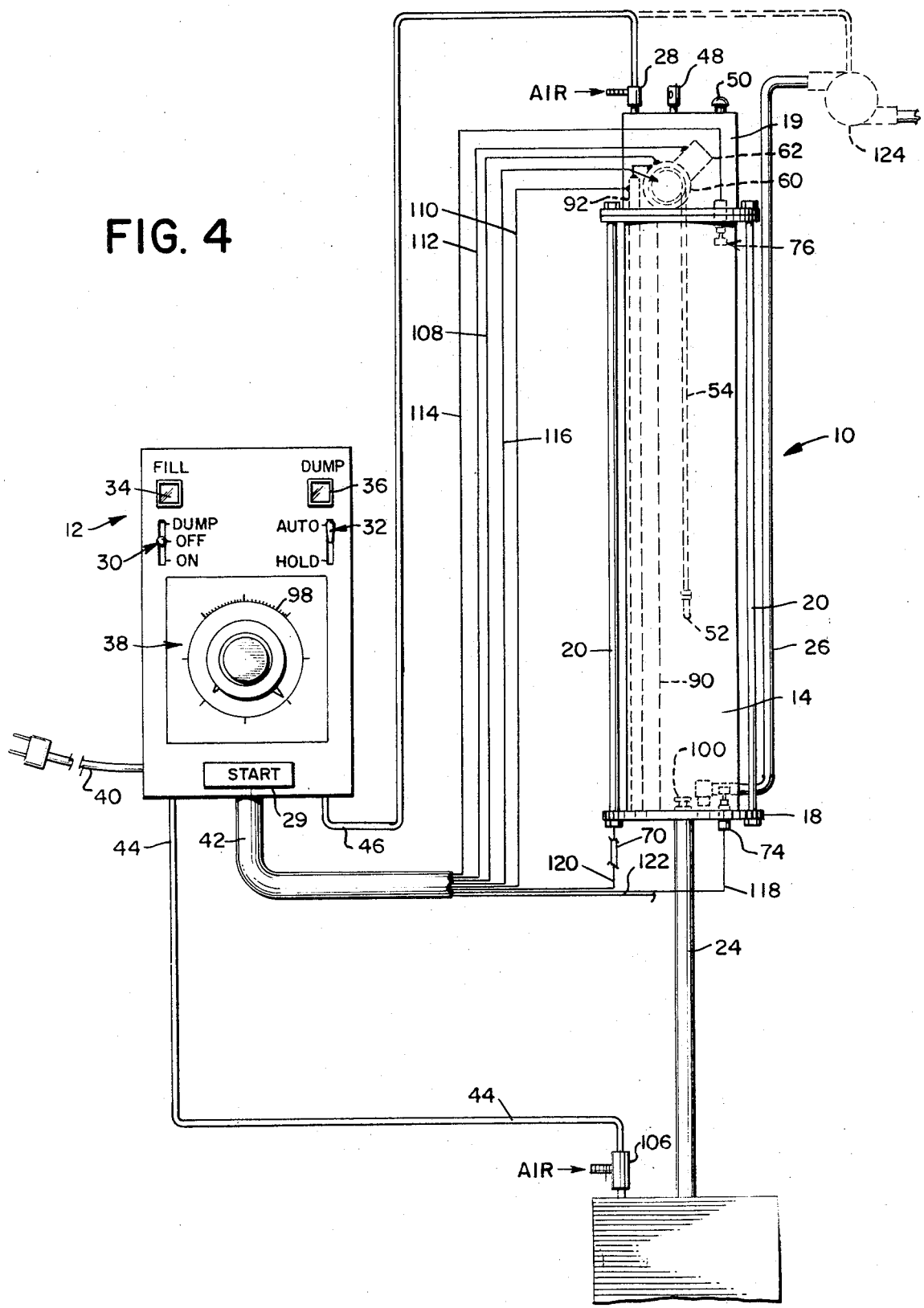

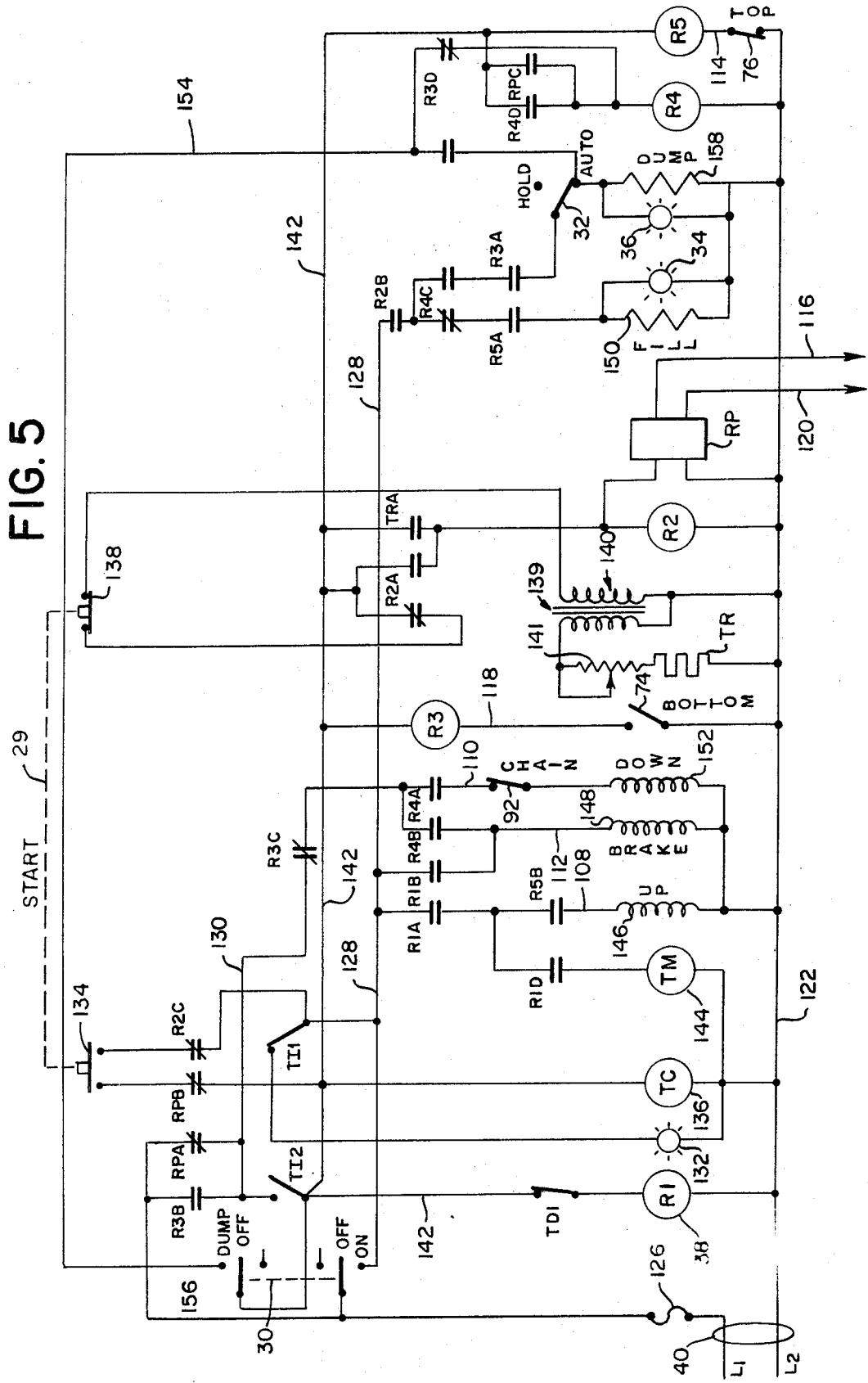

3,664,549
METHOD AND APPARATUS FOR MEASURING AND DISPENSING PREDETERMINED LIQUID VOLUMES
Matthew G. Maselli, Jr., 33 South St., Milford, Conn. 06460
Filed Jan. 26, 1970, Ser. No. 5,605
Int. Cl. B67d 5/08
U.S. Cl. 222—64
14 Claims

ABSTRACT OF THE DISCLOSURE

An upright cylindrical container is provided with a liquid level sensing probe which may be set at a predetermined position in the container. The container is filled from a predetermined minimum level until the top surface of the liquid is sensed by the probe, discontinuing filling. The liquid is then discharged to the predetermined minimum level. The probe is preferably mounted at the end of a cable or chain. The probe is lowered to contact the surface of the liquid at its minimum level. The chain or cable is driven by a synchronous motor or stepping motor. When driven by a synchronous motor, the motor is driven for a predetermined amount of time to raise the probe to the predetermined position. When driven by a stepping motor, a settable counter provides the stepping motor with a predetermined number of stepping signals from a pulse source.

SUMMARY OF THE INVENTION

This invention relates to a method and apparatus for dispensing a predetermined volume of a liquid. Particularly, it relates to a liquid volume meter for dispensing predetermined volumes of liquid admixtures added to concrete or asphalt mixtures in automatic concrete or asphalt plants. Such volume meters must measure liquid volumes in the order of a few gallons or less with great accuracy.

For example, in order to automate the mixing of concrete, at least three systems are required to measure a retarder, a water reducer and an air entraining agent. Prior art systems using flow meters, pumps running for predetermined times or weighing of the additives are expensive and suffer from inaccuracy.

Liquids or liquid-like flowable materials have been measured in large tanks or bins by lowering a probe to the surface of the material in the bin, measuring the distance that the probe was lowered and converting this into the volume of material in the tank. Such systems are exemplified by U.S. Pat. No. 2,930,131, issued Mar. 29, 1960 to F. M. Mayes, entitled "Tank Gauge," and U.S. Pat. No. 3,128,557, issued Apr. 14, 1964 to J. E. Childs, entitled "Remote Bin Level-Indicating Device." In the latter patent, a probe is continually driven up and down into contact with the top level of the material in a bin. The patent suggests that the apparatus could be used to control the filling of the bin to a predetermined volume. However, this system would not be accurate due to the continual cycling of the probe during filling from its uppermost position down to the rising surface of the material. During most of this cycle the volume in the bin is indeterminate.

It is, therefore, an object of the present invention to provide a method for measuring and dispensing liquid volumes.

Another object of the invention is to provide a method for measuring and dispensing volumes with great accuracy.

A further object of the invention is to provide a method of the above character for corrosive liquids.

A still further object of the invention is to provide a method of the above character requiring only simple, easily fabricated and maintainable apparatus for carrying out the method.

Another object of the invention is to provide a volume meter for carrying out the method of the above character.

A further object of the invention is to provide a volume meter of the above character in which a volume of a liquid is measured by allowing the liquid to attain a predetermined level in a measuring container.

Yet another object of the invention is to provide a volume meter of the above character employing a movable liquid level sensing probe.

A still further object of the invention is to provide a volume meter of the above character employing simple means for placing said probe in a predetermined position.

Another object of the invention is to provide a volume meter of the above character of great accuracy for use in dispensing admixtures in concrete and asphalt plants.

Still another object of the invention is to provide a volume meter of the above character that may be easily calibrated and checked for accuracy.

A further object of the invention is to provide a volume meter of the above character that is inexpensive, reliable and not subject to catastrophic failure.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

In general, the volume meter of the present invention comprises a right circular cylindrical vessel to which a liquid to be measured may be pumped. Means are provided for discharging the liquid down to a minimum level at which time the discharge is automatically terminated. A liquid level sensing probe is preset at a predetermined limit position. It is then driven by a synchronous motor or stepping motor to a settable predetermined position. Liquid is then added to the vessel until the top surface of the liquid contacts or is detected by the probe. This contact is sensed and thereafter the liquid is discharged down to the minimum liquid level. The probe is then reset to its predetermined limit position.

Preferably, the predetermined limit position of the probe is at the minimum liquid level, as this automatically compensates for any variation in the minimum liquid level.

The synchronous motor or stepping motor driving the probe from its initial limit position to its settable predetermined position are, broadly speaking, electrical pulse or cycle counting means. The invention provides apparatus for providing the pulse or cycle counting means with a predetermined plurality of pulses or cycles of electrical energization. Preferably a synchronous motor is used to drive the probe and a conventional presettable electromechanical timer is used as the power line cycle counting means. Alternatively, the probe drive could be a stepping motor, and a presettable counter and pulse source could be used to supply the stepping motor with a predetermined plurality of pulses.

THE DRAWINGS

For a fuller understanding of the nature and objects of the invention, reference should be had to the following detailed description taken in connection with the accompanying drawings in which:

FIG. 1 is an exploded perspective view, partially cut away and partially in cross section, of a volume meter according to the present invention;

FIG. 2 is an enlarged cross sectional view of a float switch utilized in the volume meter of FIG. 1;

FIG. 3A is a partial cross sectional view taken along the plane 3—3 of FIG. 1 of the measuring container of the volume meter of FIG. 1 shown in a particular condition during its cycle of operation;

FIG. 3B is a partial cross sectional view taken along the plane 3—3 of FIG. 1 of the measuring container of the volume meter of FIG. 1 shown in a particular condition during its cycle of operation;

FIG. 3C is a partial cross sectional view taken along the plane 3—3 of FIG. 1 of the measuring container of the volume meter of FIG. 1 shown in a particular condition during its cycle of operation;

FIG. 4 is an overall schematic view of a volume meter system according to the invention; and, FIG. 5 is a detailed electrical circuit diagram of the system of FIG. 4.

The same reference characters refer to the same elements throughout the several views of the drawings.

DETAILED DESCRIPTION

A volume meter according to the invention preferably comprises a dispensing container 10 and a control box 12, both generally indicated in FIG. 4. The dispensing container 10 comprises a right circular cylinder 14 preferably formed of a transparent, strong, durable and crack resistant material such as Lexan brand poly carbonate resin plastic manufactured by the General Electric Company.

Cylinder 14 is clamped and sealed between a pair of plates 16 and 18 by means of a plurality of clamping rods 20. Cylinder 14 may be, for example, 25½″ tall with an inside diameter of 4⅜″ and an outside diameter of 4⅞″. An upper housing cover 19 is clamped by means of clamping rods 20 to upper plate 16 and is sealed by means of an O ring 22. A fill pipe 24 is provided for filling the cylinder 14 with liquid and a discharge pipe 26 is provided for allowing the liquid to be discharged by pressurizing the cylinder 14 with air under pressure through a two-way valve 28.

The control box 12 is provided with a three-position switch 30 having ON, OFF and DUMP positions, and a two-position switch 32 having AUTO and HOLD positions. The control box 12 is further provided with a fill light 34; a dump light 36; and an electromechanical timer 38 which may, for example, be Model 305D manufactured by Automatic Timing Controls, Inc. of King of Prussia, Pa. The control box 12 is also supplied with a power cord 40, a dispenser cable 42, and fill and dump cables 44 and 46.

The upper housing 19 of dispenser 10 is provided with a pulsating safety valve 48 and a blow-out safety valve 50, in case the air pressure within the cylinder 14 exceeds recommended levels of more than approximately 200 pounds per square inch.

A liquid level sensing probe 52 is mounted at the end of a chain 54. Chain 54 passes over star wheel 56, mounted by means of an insulating bushing 58 to the shaft of a synchronous motor 60, having an electrically deactivated brake 62, such as Hursh Model PC–DA. An electrical brush assembly 63 comprising contact 64, brush and spring assembly 66 and mounting block 68 is provided for making continuous electrical contact to the chain 54 and thus the probe 52 through star wheel 56. The brush assembly 63 may be No. 33124 manufactured by the Black and Decker Company.

Another electrical contact is made via wire 70 to the metal base 18 and thus to the liquid 72 within the cylinder 14. When the liquid 72 contacts probe 52, electrical continuity is established between brush contact 64 and wire 70.

As previously explained, preferably the liquid 72 is never completely discharged from the cylinder 14 and to that end a float switch 74 is provided for terminating the supply of air through two-way valve 28 when liquid 72 reaches a predetermined lower level. Another float switch 76 is mounted in top plate 16 to sense if top level of liquid 72 reaches its extreme level and to then discontinue any further filling of the container through input pipe 24.

The float switches 74 and 76 are identical in construction. Switch 74 is shown in detail in FIG. 2. It comprises a liquid-tight housing 78, which is threaded into plate 18 by means of threads (not shown) and sealed by means of O ring 80. A sealed reed switch 82 is mounted within the housing 78 and is actuated by a magnet assembly, generally indicated at 84, mounted in a float 86. When the magnet assembly 84 is in its lower position near or against housing 78, reed switch contacts 82 open. When float 86 is in its upper position near or against an annular stop 88, reed switch contacts 82 are closed.

Again referring to FIG. 1, in order to protect the chain 54 from immersion in the liquid 72, which may be corrosive or gummy, an inner tube 90 is provided between upper plate 16 and lower plate 18, in which the end of the chain 54 opposite probe 52 travels. In order that the chain not descend into the liquid 72 in the event of failure of the sensing means (FIG. 5) connected between the probe 52 and the liquid 72, a chain switch 92 is provided which is engaged by a tab 94 (FIG. 3) mounted near the end of the chain 54 opposite the probe 52.

In operation, the motor 60 and brake 62 are electrically energized to drive the probe 54 down until it engages the top surface 96 of the liquid 72. This contact is sensed and the motor and the brake 62 de-energize. The motor immediately stops and the probe comes to rest against the surface of the liquid 96 as shown in FIG. 3A.

Referring again to FIG. 1, and assuming that the switch 30 has been put in the ON position, the timer 38 set to the desired volume (its scale 98 preferably being marked off either in units of volume of the liquid 72 being dispensed or in units of weight or volume of the mixture to which the liquid 72 is to be added), the start switch 29 is depressed and the timer begins to time out. During this timing cycle, power is applied to the motor 60 and brake 62 to raise the chain 54 and thus the probe 52 until the timer 38 times out. The probe 52 is thus raised to a predetermined position such as illustrated in FIG. 3B. Fill means which may be a pump or air pressurization of a container of the liquid to be supplied are energized shortly after the timer to supply liquid 72 through inlet pipe 24 to cylinder 14, as shown in FIG. 3B. Inlet pipe 24 is preferably provided with a stream diverter 100 for diverting the liquid horizontally so that the surface 96 is not displaced through turbulence of the incoming liquid. When the liquid level 96 reaches the probe, as shown in FIG. 3C, electrical contact is established between the probe and the liquid. This is sensed and the filling discontinued. Then, either immediately or on demand of some external means, air is supplied to two-way air valve 28 (FIG. 1) to force liquid out through discharge head 102, having a grate 104, through discharge pipe 26. The discharge continues until the surface 96 of the liquid reaches the level shown in FIG. 1 at which time the float 86 on the float switch 74 lowers enough to close the contacts 82 (FIG. 2) and the supply of air to the two-way air valve 28 is discontinued. The discharge pipe 26 has a one-way valve or similar means connected thereto (not shown) so that the liquid therein will not come back into the cylinder 14 when the two-way valve 28 opens the interior of the cylinder 14 to the air. The chain 54 is now driven by means of the motor and brake 62 downward until the probe 52 contacts the surface 96 of the liquid as shown in FIG. 3A and the cycle may be repeated at will.

As seen in FIG. 3C, the cylinder 14 is preferably provided with a graduated scale 105 whereby an operator can easily check to see that the liquid rises to the proper setting. Thus, the apparatus can be calibrated and checked at any time without the use of any extra apparatus.

Now referring to FIG. 4, in a volumeter system according to the invention the control panel 12 and measuring vessel 10 are connected by means of cable 42. Fill cable 44 is connected to a fill pump or as previously explained to a two-way air valve 106 controlling admittance of air under pressure to a sealed reservoir of the liquid to be measured. Fill valve 106 is connected to vessel 10 by inlet pipe 24. Cable 42 comprises conductor 108 connected to motor 60; conductor 110 connected to motor 60 through the chain actuated switch 92 which is normally closed; conductor 112 connected to brake 62; conductor 114 connected to top float switch 76; probe conductor 116 connected via brush assembly 63 to chain 54; conductor 118 connected to bottom float switch 74; conductor 120 connected to bottom plate 18 via wire 70; and common conductor 122 which is connected (not shown) to the motor 60, brake 62, top float switch 76, and bottom float switch 74. Discharge cable 46 is connected to the two-way air valve 28 as shown. The air valve when de-energized opens the interior of vessel 10 to the atmosphere and when energized closes that opening and allows air under pressure into vessel 10. Alternatively, discharge cable 46 may be connected to a discharge pump 124 in discharge line 126.

The detailed electrical schematic circuit diagram of the system of FIG. 4 is shown in FIG. 5. Referring to FIG. 5, line cord 40 is connected to a source of 110 volt alternating current, across lines L1 and L2. A fuse 126 is in series with line L1. When the ON-OFF-DUMP switch 30 is positioned to ON, power is supplied from L1 via conductor 128 to timer motor, up, and brake circuits, and to fill and dump circuits. Power is continuously supplied from conductor L1 through normally closed probe relay contact RPA via conductor 130 to the brake and down circuits. A timer light 132 is energized via conductor 128 and normally closed timer contacts TI1.

Depressing start switch 29 closes normally open contacts 134 supplying power from line 128 through normally closed contacts R2C, normally closed contacts RPB to energize timer clutch 136. This immediately causes transfer of timer instantaneous contacts TI1 and TI2. The opening of normally closed contacts 138 of start switch 29 disconnects a thermal timer or thermal relay, generally indicated at 140 to prevent an inadvertent fill of dispenser 10 at this time.

When contacts TI1 open, the timer light 132 goes out. When timer contacts TI2 close, a holding path to the timer clutch 136 is provided since conductor 130 is now connected to conductor 142. If the dispenser 10 (FIG. 1) is not completely filled up to the upper top float switch 76, relay R5 is now energized since top float switch 76 is normally closed. Normally open contacts R5A of relay R5 now close to arm a fill circuit and normally open contacts R5B also close to arm the up circuit.

Energization of conductor 142 through timer instantaneous contacts TI2 energizes relay coil R1 through the normally closed timer delay contacts TD1. Relay R1 remains energized until the end of the timing period when the timer delay contacts TD1 open. Normally open contacts R1A, R1B and R1D of relay R1 close to supply energization from conductor 128 to the timer motor 144, probe up motor coil 146 and probe brake motor coil 148 simultaneously. The probe 52 (FIG. 1) is lifted on chain 54 until the timer times out opening timer delay contacts TD1.

Relay R1 then de-energizes, opening contacts R1A, R1B and R1D thereon de-energizing timer motor 144, the up coil 146 and the brake coil 148. The probe 52 stops its upward travel nearly instantaneously due to the action of the brake which is engaged when the brake coil 148 is de-energized.

When the start switch 29 was released, normally closed contacts 138 closed supplying power to the thermal delay 140 via normally closed contacts R2A. Thermal delay 140 comprises a step down transformer 139 to supply 24 volts to a 150 ohm 2 watt potentiometer 141 and thermal relay TR. Thermal relay TR may be numbered 25-5-4-500-A manufactured by Relay Specialty Corporation and is adjusted for a thermal delay up to approximately 6 seconds, while the electromechanical timer 38 provides timing from 0 to 30 seconds. Thus, normally the relay contacts TRA of the thermal relay TR are energized long before the timer times out. The purpose of the thermal delay 140 is to delay the beginning of the filling operation until the probe has lifted a predetermined distance off the surface of the lquid 72. The thermal delay is normally set for 2 to 3 seconds. When the thermal delay contacts TRA are closed, relay R2 is energized.

Energization of relay R2 closes normally open contacts R2A thereon to provide a holding circuit for relay R2 and to provide energization to probe sensing amplifier RP.

Closure of normally open contacts R2B on relay R2 provides energization to a fill coil 150 and fill lamp 34 through normally closed contacts R4C and normally open contacts R5A of the then energized relay R5. Filling continues until the rising liquid comes in contact with the probe 52, closing the circuit between conductor 120 and probe conductor 116. This causes energization of a relay (not shown) within the relay probe amplifier RP. The relay probe amplifier or sensing amplifier RP may be a Curtis Model ELS. Establishment of the probe liquid circuit causes transfer of relay probe contacts RPA, RPB and RPC.

When relay R2 energized, normally closed contacts R2C thereon opened, disconnecting normally open contacts 134 of start switch 29 to prevent circuit interference if the start switch is inadvertently operated during he fill cycle.

The rising liquid in he cylinder 14 causes bottom float switch 74 to close, energizing relay R3. Closure of normally open contacts R3A thereof arms a dump circuit. Closure of normally open contacts R3B thereon provides a parallel holding circuit for the timer clutch coil 136 through timer contacts TI2. Opening of contacts R3C thereof prevents energization of the probe down motor coil 152. Transfer of contacts R3D thereon establishes a circuit via conductor 154 to the dump contact 156 of ON-OFF-DUMP switch 30 and prevents operation of the manual dump from energizing relay R4 now that relay R3 has energized.

It will be apparent that it is impossible to empty or dump the dispenser 10 if the lower float switch 74 is open as normally open contacts R3A and R3B of relay R3 will be open.

When the probe contacts the liquid the normally open contacts RPC of the probe relay RP close to energize relay R4. Normally open contacts R4D thereof close establishing holding circuit for relay R4. Transfer of contacts R4C thereof deenergizes fill solenoid 150, and energizes dump solenoid 158 and dump light 36 if switch 32 is in the automatic position. Closure of relay contacts R4A and R4B of relay R4 arm the motor probe brake and down coils 148 and 152, respectively.

When the liquid reaches the level shown in FIG. 1, bottom float switch 74 opens, de-energizing relay R3. Contacts R3A thereof de-energize the dump solenoid 158, and contacts R3B open. It should be noted that at this time the normally closed probe relay contacts RPA and RPB continue energization of the timer clutch and line 130, respectively.

Closure of contacts R3C of relay R3 thus then energizes brake and down coils 148 and 152 driving the probe down until it contacts the top of the liquid as shown in FIG. 3A opening normally closed contacts RPA, thus de-energizing brake and down coils 148 and 152.

Probe relay contacts RPB open de-energizing the timer clutch which resets the timer. Timer contacts TI1 and TI2 transfer to de-energize relays R2 and R4 as well as prevent the energization of relays R1, R3 and R5 all connected to conductor 142. It should be noted that the probe amplifier has a built-in delay so that contacts RPA and RPB are held open long enough to allow the timer to fully reset.

The cycle may be aborted at any time after the bottom float switch 74 has closed by putting switch 30 in the dump position except when fill solenoid 150 is energized.

This manual dump is discontinued when bottom float 74 opens de-energizing dump coil 158. Energization of relay R4 during the manual dump provides automatic probe return at the completion of the dump cycle.

If a fill cycle has started and the power is discontinued to lines L1, L2 the timer automatically resets.

If the AUTO-HOLD switch 32 is in the hold position, the liquid will not be discharged from the vessel 10 until the switch is returned to the auto position or switch 30 is put in the manual dump position. This may also be effected by remote means controlling a relay across the AUTO-HOLD switch contacts.

It will thus be seen that a simple method of measuring predetermined liquid volumes has been provided and that this method can be effected by the above-described relatively simple and trouble-free apparatus.

While the apparatus disclosed in this application uses electrical contact between the probe 52 and the liquid surface 96 to detect the rise of the liquid surface to a predetermined position where the probe has been set, other means could be used. For example, a fiber optic liquid level sensor such as manufactured by Dolan Jenner Industries, Inc. could be used which requires no liquid contact. Another sensor comprising a frequency sensing oscillator connected to a coil at the end of the chain which requires no contact could also be used or the probe might employ a thermister whose resistance would change upon immersion in the liquid.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of the class described comprising:
    (A) driving a surface level sensing probe within a vessel from a fixed initial position to a settable position;
    (B) filling the vessel with a liquid or liquid-like material until the upper surface thereof is sensed by the surface level sensing probe when stationary at the settable position;
    (C) emptying said vessel to a predetermined minimum level;
    (D) driving the surface level sensing probe to its original fixed position; and,
    (E) terminating said last-named driving step when the minimum level is sensed by the probe
wherein said emptying step is accomplished by supplying a pressurized gas to the vessel.

2. A method of the class described comprising:
    (A) driving a surface level sensing probe within a vessel from a fixed initial position to a settable position;
    (B) filling the vessel with a liquid or liquid-like material until the upper surface thereof is sensed by the surface level sensing probe when stationary at the settable position;
    (C) emptying said vessel to a predetermined minimum level;
    (D) driving the surface level sensing probe to its original fixed position; and,
    (E) terminating said last-named driving step when the minimum level is sensed by the probe
wherein said driving of the liquid level sensing probe to a settable position is accomplished by electrical signal counting means and the additional step of:
    (F) supplying a predetermined number of electrical signals to the counting means.

3. The method defined in claim 2 wherein said filling step is initiated a short time after the initiation of said first driving step and continues during said first driving step.

4. A method of the class described comprising:
    (A) driving a surface level sensing probe within a vessel from a fixed initial position to a settable position;
    (B) filling the vessel with a liquid or liquid-like material until the upper surface thereof is sensed by the surface level sensing probe when stationary at the settable position; and,
    (C) driving the surface level sensing probe to its original fixed position
wherein said driving of the liquid level sensing probe to a settable position is accomplished by electrical signal counting means and the additional step of:
    (D) supplying a predetermined number of electrical signals to the counting means.

5. The method defined in claim 4 wherein said filling step is initiated a short time after the initiation of said first driving step and continues during said first driving step.

6. A liquid or liquid-like material dispenser comprising:
    (A) a vessel;
    (B) a surface level sensing probe;
    (C) suspending means for suspending said probe above the surface of liquid in said vessel;
    (D) driving means for driving said suspending means to suspend said probe at a predeterminable position;
    (E) filling means for filling said vessel until said probe senses the rising surface of the liquid; and,
    (F) time delay means for delaying actuation of said filling means until a short time after said driving means has begun driving said probe to said predeterminable position.

7. A liquid or liquid-like material dispenser comprising:
    (A) a vessel;
    (B) a surface level sensing probe;
    (C) suspending means for suspending said probe above the surface of liquid in said vessel;
    (D) driving means for driving said suspending means to suspend said probe at a predeterminable position; and
    (E) filling means for filling said vessel until said probe senses the rising surface of the liquid
wherein said driving means comprises means for driving said suspending means a fixed distance in response to each of a plurality of electrical signals and:
    (F) means for supplying to said last-named means a preselectable number of said electrical signals.

8. A dispenser as defined in claim 7 wherein said last-named means comprise:
    (a) a synchronous motor, and
    (b) a timer for supplying alternating current to said synchronous motor for a preselectable time interval.

9. A dispenser as defined in claim 8 wherein said synchronous motor is reversible and comprises electrically operated brake means for quickly halting movement of said probe upon de-energization of the synchronous motor.

10. A dispenser as defined in claim 8 and
    (G) means for causing said synchronous motor to drive said probe to a predetermined initial position before driving said probe to said predeterminable position.

11. A dispenser as defined in claim 10 and:
(H) a bottom level sensor for detecting a lower minimum level of liquid in said vessel; and,
(I) emptying means for emptying said vessel until operation of said bottom level sensor, said probe being driven by said synchronous motor down to said minimum level.

12. A dispenser as claimed in claim 11 wherein said emptying means comprises means for supplying gas under pressure to said vessel.

13. A liquid or liquid-like material dispenser comprising:
(A) a vessel;
(B) a surface level sensing probe;
(C) suspending means for suspending said probe above the surface of liquid in said vessel;
(D) driving means for driving said suspending means to suspend said probe at a predeterminable position;
(E) filling means for filling said vessel until said probe senses the rising surface of the liquid; and,
(F) means for driving said suspending means to drive said probe to a predetermined initial position before driving said probe to said predeterminable position.

14. A dispenser as defined in claim 13 and:
(G) a bottom level sensor for detecting a lower minimum level of liquid in said vessel; and,
being driven to said minimum level.
(H) emptying means for emptying said vessel until operation of said bottom level sensor, said probe

References Cited

UNITED STATES PATENTS

| | | | |
|---|---|---|---|
| 3,224,638 | 12/1965 | Harrell, Jr. | 222—64 |
| 3,435,989 | 4/1969 | Lorenzene | 222—1 |

STANLEY TOLLBERG, Primary Examiner

U.S. Cl. X.R.

222—76

UNITED STATES PATENT OFFICE
CERTIFICATE OF CORRECTION

Patent No. 3,664,549          Dated      May 23, 1972

Inventor(s)     Matthew G. Maselli, Jr.

It is certified that error appears in the above-identified patent and that said Letters Patent are hereby corrected as shown below:

Column 3, line 28, change "FIG. 4" to -- FIG. 1 --.

Column 5, line 25, change "discharge line 126" to

-- discharge line 26 --.

Column 6, line 12, change "lquid" to -- liquid --.

Line 33, change "he" to -- the --.

Line 35, change "he" to -- the --.

Column 10, line 7, cancel "being driven to said minimum level."

Line 9, after "probe" insert -- being driven to said minimum level. --

Signed and sealed this 1st day of May 1973.

(SEAL)
Attest:

EDWARD M. FLETCHER, JR.          ROBERT GOTTSCHALK
Attesting Officer                 Commissioner of Patents